(12) United States Patent
Scheungraber

(10) Patent No.: US 10,456,955 B2
(45) Date of Patent: Oct. 29, 2019

(54) NUT FOR A CLAMPING MECHANISM OF A VULCANIZING PRESS, CLAMPING MECHANISM, VULCANIZING PRESS AND SUPPORT DEVICE FOR COMPONENTS OF A VULCANIZING PRESS

(71) Applicant: Rema Tip Top AG, Poing (DE)

(72) Inventor: Patric Scheungraber, Pliening (DE)

(73) Assignee: REMA TIP TOP AG, Poing (DE)

( * ) Notice: Subject to any disclaimer, the term of this patent is extended or adjusted under 35 U.S.C. 154(b) by 299 days.

(21) Appl. No.: 15/509,694

(22) PCT Filed: Sep. 11, 2015

(86) PCT No.: PCT/EP2015/070821
§ 371 (c)(1),
(2) Date: Mar. 8, 2017

(87) PCT Pub. No.: WO2016/038185
PCT Pub. Date: Mar. 17, 2016

(65) Prior Publication Data
US 2017/0259464 A1 Sep. 14, 2017

Related U.S. Application Data

(60) Provisional application No. 62/049,773, filed on Sep. 12, 2014.

(30) Foreign Application Priority Data

Sep. 12, 2014 (DE) .................. 20 2014 007 293 U

(51) Int. Cl.
*B29C 35/00* (2006.01)
*B29D 30/06* (2006.01)
(Continued)

(52) U.S. Cl.
CPC ........ *B29C 35/002* (2013.01); *B29D 30/0601* (2013.01); *B29D 30/0603* (2013.01);
(Continued)

(58) Field of Classification Search
CPC .............. B29C 35/002; B29D 30/0601; B29D 30/0602; F16B 3/04; F16B 7/06
(Continued)

(56) References Cited

U.S. PATENT DOCUMENTS 1,909,400 A 5/1933 Hall
6,422,623 B1 7/2002 Thomas
(Continued)

FOREIGN PATENT DOCUMENTS

DE 22 20 272 A 4/1973
DE 29 46 249 A1 4/1981
(Continued)

OTHER PUBLICATIONS

PCT International Search Report and Written Opinion for International Application No. PCT/EP2015/070821, dated Mar. 31, 2016, 10 pages.

*Primary Examiner* — Robert B Davis
(74) *Attorney, Agent, or Firm* — Womble Bond Dickinson (US) LLP

(57) ABSTRACT

The invention relates in particular to a nut 1 for a clamping mechanism 10, a clamping mechanism 10 comprising a tie bolt 11 and two nuts 1, a vulcanizing press 20 comprising clamping mechanisms 10 and a support device 23.

21 Claims, 5 Drawing Sheets

Figures 1A, 1B:
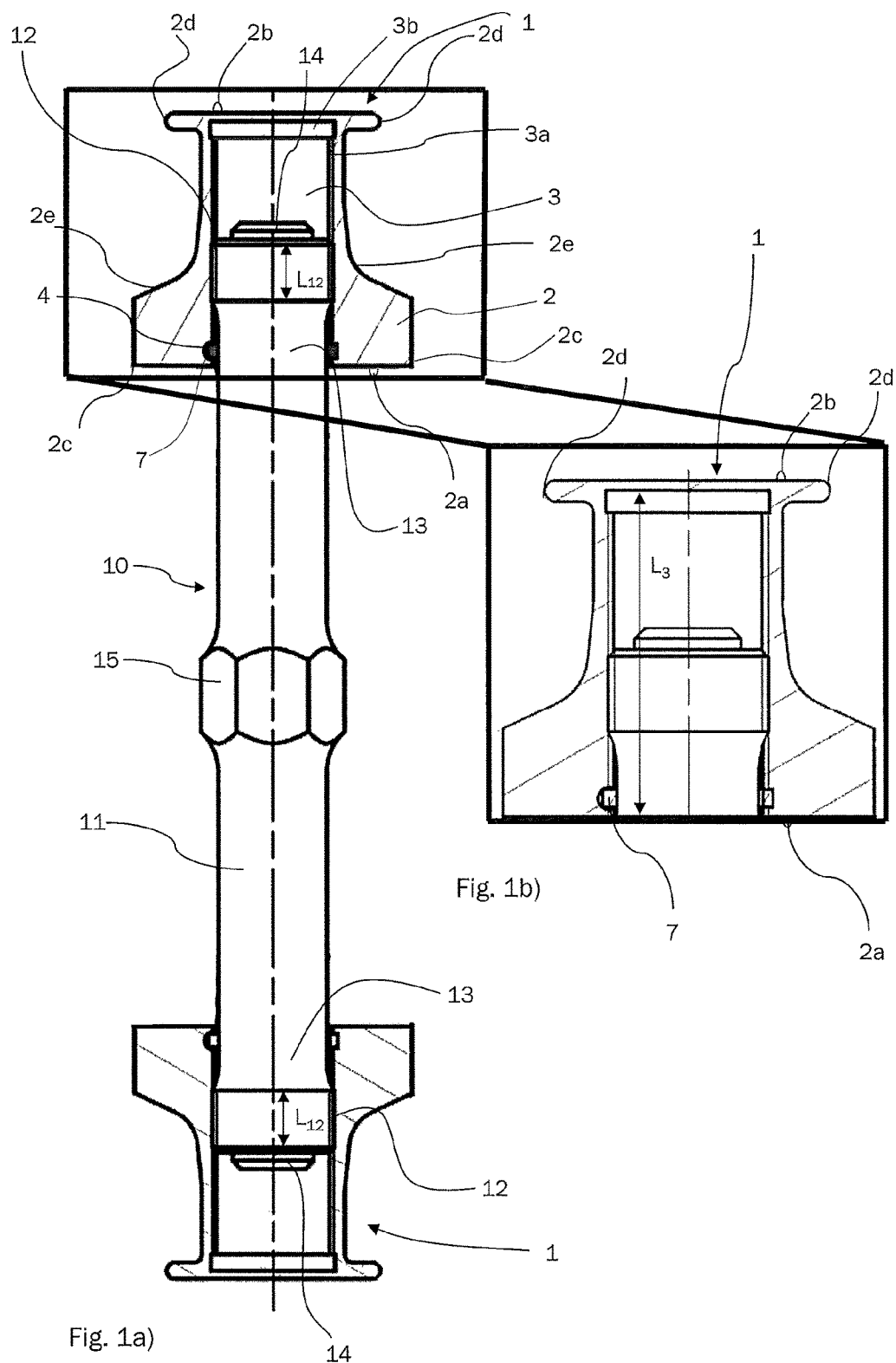

(51) Int. Cl.
  *F16B 7/18*   (2006.01)
  *F16B 37/04*  (2006.01)
  *F16B 41/00*  (2006.01)
  *F16B 3/04*   (2006.01)
  *F16B 7/06*   (2006.01)
  *B65G 7/12*   (2006.01)
  *F16B 37/00*  (2006.01)
  *F16B 5/02*   (2006.01)

(52) U.S. Cl.
  CPC .................. *B65G 7/12* (2013.01); *F16B 3/04* (2013.01); *F16B 7/06* (2013.01); *F16B 7/187* (2013.01); *F16B 37/00* (2013.01); *F16B 37/045* (2013.01); *F16B 41/002* (2013.01); *F16B 5/0275* (2013.01)

(58) Field of Classification Search
  USPC .......................................................... 294/26
  See application file for complete search history.

(56) References Cited

U.S. PATENT DOCUMENTS 6,921,325 B1 *   7/2005   Mace .................. A01M 31/006
                                                        452/6
2004/0217609 A1   11/2004   Freiling et al.

FOREIGN PATENT DOCUMENTS

| DE | 103 42 552 A1 | 4/2005 |
| FR | 2 438 193 A1 | 4/1980 |
| GB | 1 200 132 A | 7/1970 |
| JP | 3 254100 B2 | 2/2002 |
| WO | WO 97/48937 A1 | 12/1997 |

* cited by examiner

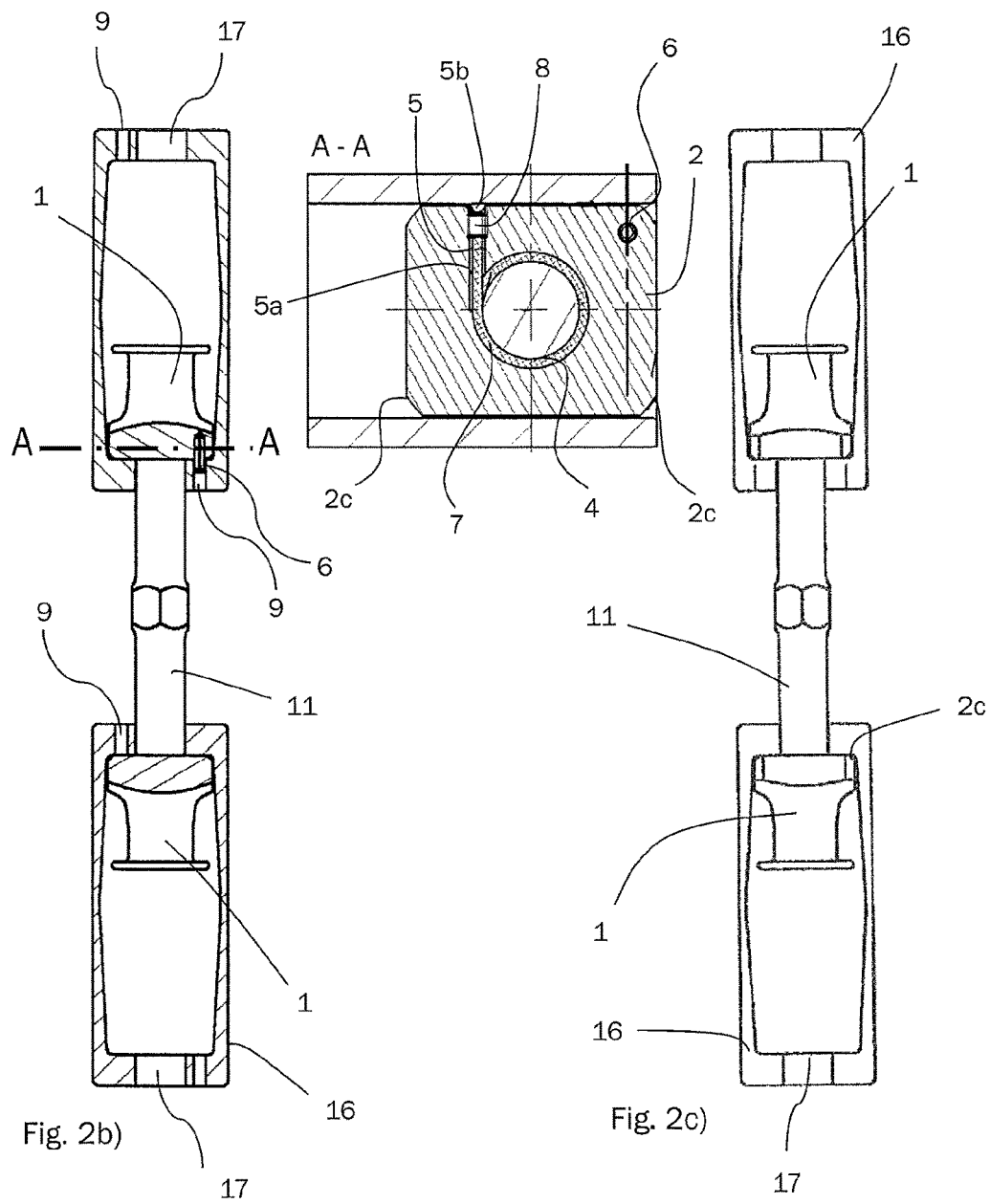

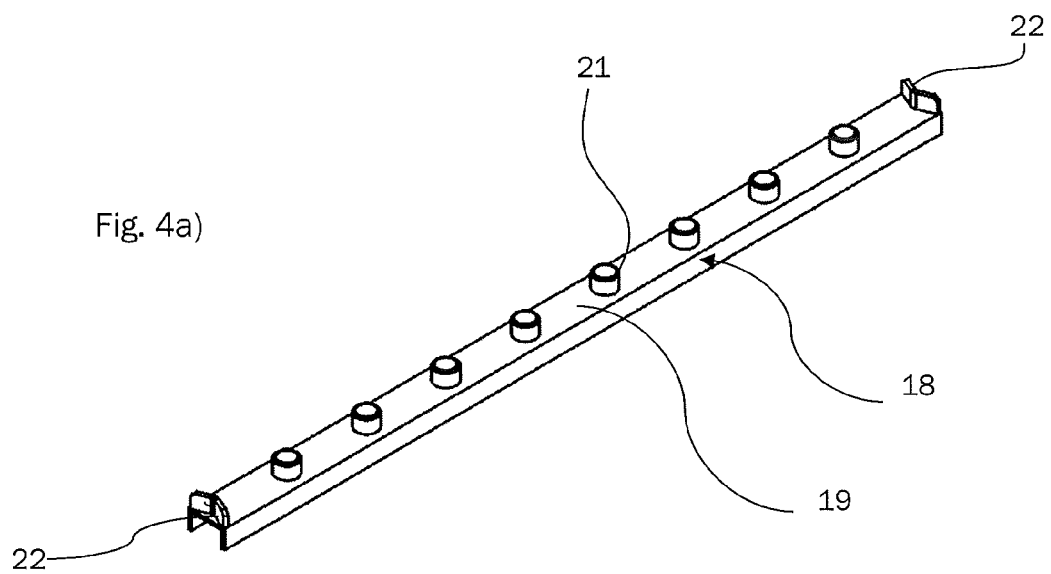
Fig. 4a)
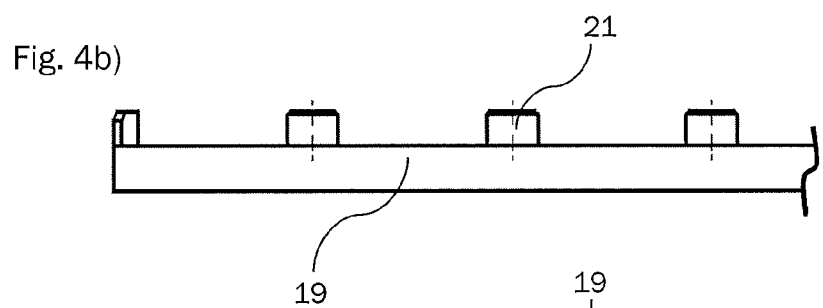
Fig. 4b)
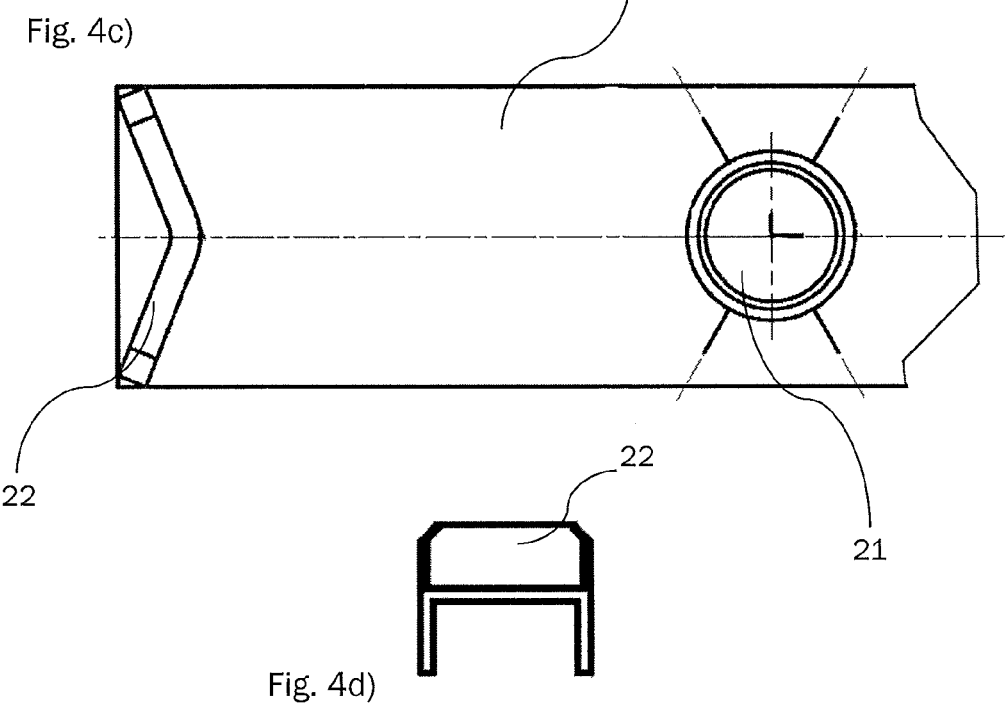
Fig. 4c)
Fig. 4d)

NUT FOR A CLAMPING MECHANISM OF A VULCANIZING PRESS, CLAMPING MECHANISM, VULCANIZING PRESS AND SUPPORT DEVICE FOR COMPONENTS OF A VULCANIZING PRESS

CROSS-REFERENCE TO RELATED APPLICATION

This application is the U.S. National Stage entry under 35 U.S.C. § 317 of international application PCT/EP2015/070821, filed 11 Sep. 2015, which in turn claims priority to German utility model application DE 20 2014 007 293.0 and U.S. provisional application 62/049,773, both filed 12 Sep. 2014.

The present invention relates to a nut for a clamping mechanism of a mobile vulcanizing press, a clamping mechanism, a mobile vulcanizing press and a support device for components of a mobile vulcanizing press. The nut of the clamping mechanism has in particular the technical advantage that it is robust, has a relatively low weight, a design chosen with respect to optimized ergonomics and good safety at work and can be permanently connected to the clamping mechanism without having to use additional securing means for this purpose. The clamping mechanism has in particular a relatively low weight, is less complex to handle and very robust as regards a long service life. The vulcanizing press additionally has traverse (hollow sections) which are also weight-optimized. The support device renders possible inter alia a better and easier handling of components of the vulcanizing press, such as the traverse hollow sections.

Known vulcanizing presses have heatable plates (hot plates) which are arranged above and below a product to be vulcanized. The product to be vulcanized can be e.g. a conveyor belt for use in surface mining. The hot plates produce the necessary temperature in order to carry out the vulcanization. The necessary mechanical pressure for the vulcanization is built up e.g. by means of air-filled or liquid-filled pressure pads. Both the hot plates and the pressure pad are arranged between so-called traverses and/or traverse hollow sections which fix the hot plates and pressure pads. The hot plates are arranged above and below the product to be vulcanized. The previously described structure, comprising the hot plates, the pressure pad, the product to be vulcanized and the traverse hollow sections, is held together by means of clamping mechanisms which connect the upper and lower traverse hollow sections to one another.

The connection of known clamping mechanisms to the known traverse hollow sections is complicated since inter alia loose securing pins have to be mounted. The securing pins are introduced through bores in the traverses to prevent the bolt/nut unit from sliding off the traverse. The introduction of the loose securing pins requires a lot of time, as a result of which the set-up times are extended. In addition, the relatively small securing pins can be easily lost. The clamping of the tie bolts and the insertion of the loose securing pins are also sub-optimal with respect to the safety at work and the avoidance of injuries to the technician, since the technician can be easily hurt by the edges of the tie bolt, traverse hollow sections and the like, e.g. when he threads the loose securing pins.

Furthermore, the individual components of known vulcanizing presses, in particular the tie bolts and the traverse hollow sections, are relatively heavy and thus more difficult to handle. Known tie bolts made from carbon are also fracture-prone, which can lead to damage in the case of the often harsh working conditions and stresses which such components have to tolerate. For example, the individual components are often dropped in everyday work or thrown to storage areas. This exposes the tie bolts, traverse hollow sections and the like to high mechanical stresses as well as to the stresses occurring during the operation anyway.

An object of the present invention is to provide a nut, a clamping mechanism, a mobile vulcanizing press and a support device, which can be handled in a less complicated and complex way and offer better safety at work, are robust and thus more durable even under harsh operating conditions and simultaneously have a lower weight.

The object is achieved by the combinations recited in the independent and dependent claims.

The invention comprises a nut for a clamping mechanism of a mobile vulcanizing press. The nut can have a nut body. The (nut) body can have a blind hole having an internal thread in order to receive a tie bolt. A groove can be provided and is preferably open towards the blind hole. The groove can be arranged in a circumferential portion of the blind hole. In other words, the groove can comprise a circumferential region of the blind hole. It is particularly preferred for the groove to be annular. It is particularly preferred for the groove which is open towards the blind hole to be circumferential once along an inner surface of the blind hole; in this case, the groove preferably runs perpendicularly to the longitudinal axis of the blind hole. In addition, the nut can have an access bore which can connect an exterior side of the nut body to the groove. The exterior side can preferably be the sideward exterior surface and/or the lateral surface of the nut. The groove and/or the access bore can be suitable to receive a fixing element. The groove and the access bore are preferably designed in such a way that they jointly form a cavity where the fixing element can be placed (continuously).

The nut according to the invention has the advantage that it can be permanently connected to a tie bolt. The groove is preferably arranged in a blind hole portion which is adjacent to an opening of the blind hole and/or which is arranged as closely as possible to the opening of the blind hole. In particular, the fixing element which can be inserted into the groove can permanently retain the tie bolt screwed in the blind hole in a technically advantageous manner. Therefore, no further securing means are required which are difficult to handle and, with respect to a risk of injury, are unfavorable to a technician. Furthermore, the nut is preferably made of high-strength steel, as a result of which a low weight can be obtained. A further advantage of the invention is that the fixing element can also adopt a sealing function. In other words, the fixing element can permanently connect the nut and a tie bolt and simultaneously seal the threaded connection against the access of dust, dirt and/or water. Therefore, the fixing element can act in a particularly preferred fashion as a fixing and sealing element.

In addition, a fixing element can be arranged in the groove and the access bore in such a way that the fixing element can occupy in whole or in part the groove and the fixing element can also occupy at least a segment of the access bore. In other words, the fixing element can be arranged in the cavity which is formed by the access bore and the groove, the fixing element preferably only filling some of the part of the cavity that is formed by the access bore.

The access bore is preferably designed in such a way that a drill channel runs from a side of the nut to the groove. The drill channel and/or the access bore preferably have an internal thread, in which a fastening means can be screwed.

According to a preferred example, the fastening means, e.g. a screw or a pin, and the fixing element can be made of two parts and separately, i.e. are not connected to each other. According to this example, a pre-assembly of the nut and the tie bolt can be carried out. For this purpose, it is initially possible to screw the bolt in the nut. Then, the fixing element can be inserted into the groove via the through-bore to then screw the fastening means in the through-bore. When the through-bore has no internal thread and the fastening means is a pin, the fastening means can also be inserted into the through-bore. The fastening means then retains the fixing element in its predetermined position. The fixing element forms a loop about the tie bolt inside the nut and/or groove, thus permanently holding the tie bolt in the nut. The fastening means can additionally be fixed permanently by means of adhesive.

Alternatively, the fixing element can be connected to the fastening means. The fastening means is preferably a screw or sleeve having an external thread, as a result of which the fastening means can be moved inside the access bore by means of a screw movement. The fastening means is preferably arranged completely inside the access bore. A relative position of the fastening means in the access bore can be adjustable, in particular by means of the above described screw connection between access bore and fastening means. The fastening means can be connected to the fixing element in such a way that a change in the relative position of the fastening means can expand or compress the fixing element. In other words, the fixing element inside the access bore can be connected to the fastening means via a portion according to this alternative example and can be arranged with another portion inside the groove. When the relative position of the fastening means inside the access bore is changed, a tensile force and thus an expansion is applied to the fixing element due to the connection between the fixing element and the fastening means, which causes the fixing element inside the groove to constrict. In other words, when the relative position of the fastening means with the fixing element mounted thereon is changed, a loop forming the fixing element inside the groove/blind hole is constricted, i.e. the diameter thereof is reduced. On the other hand, the diameter of the loop can be increased when the relative position of the fastening means is changed in the other direction. In even more concrete terms, when the fastening means is screwed out, i.e. when the relative position of the fastening means is moved away from the groove, the loop which forms the fixing element in the groove is preferably constricted. The loop is loosened/widened during a screw-in operation.

The above described effect of constricting or widening the loop can be preferably supported by retaining one end of the fixing element, which is opposite the end connected to the fastening means. For example, a taper can be provided in the groove for this purpose and clamps the fixing element in the tapering region. It is also possible to provide e.g. an adhesive or screw connection which retains one end of the fixing element in the groove.

The two above described examples render possible that the fixing element places a loop about the tie bolt, which secures the screwed-in tie bolt against losing it. The loop can also be adjusted subsequently (e.g. after an assembly of the clamping mechanism) by constricting the fixing element loop in order to reliably secure the tie bolt against a loss. The constriction of the loop can be carried out with little effort when a technician inserts a suitable screw-driving tool from outside into the access bore and changes the relative position of the fastening means by the screw-driving tool.

It is also an advantage that the fastening means is fully countersunk in the access bore since no parts of the securing mechanism protrude from the exterior surface of the nut. This reduces the risk of injury and renders possible a perfectly fitting installation in traverse hollow sections, as specified below.

A further technical advantage of the above described fixing element can be that this element simultaneously renders possible a dust and dirty seal. This extends the service life of nut and tie bolt and/or thread since e.g. dust particles no longer clog the thread of the nut.

The fixing element is preferably strip-like and the material of the fixing element preferably comprises felt or a plastic material, preferably an elastomer. The fixing element can also have a plurality of spheres which can be made of metal or a plastic material.

The advantage of this strip shape which shall preferably describe an elongate sealing member having two ends is that the fixing element can be inserted into the groove and the access bore with little effort. The material, which is preferably felt, has excellent properties as regards the protection of the tie bolt and the seal against dust particles and also prevents the fixing element from scratching or damaging the tie bolt when the loop is constricted.

When the fixing element is formed from a plurality of spheres, the latter can be inserted into the groove with very little effort during a pre-assembly of the tie bolt and the nut via the through-bore. For this purpose, it is preferred to insert at least such a number of spheres that the groove is occupied in part, preferably in whole, and the tie bolt is securely retained in the nut. Having inserted the spheres into the through-bore, the fastening means can be screwed in to retain the spheres inside the groove at a predetermined position.

The surfaces of the two axial ends of the nut body can be planar and arranged in parallel to one another. An and/or the opening of the blind hole can be arranged in one of the two surfaces. The nut preferably has a longitudinal axis which is preferably also a symmetry axis. The longitudinal axis coincides with special preference with a longitudinal axis of the blind hole. The two end portions of the nut along the longitudinal axis thereof shall here preferably be understood to be axial ends of the nut body. The surface of the axial end where the blind hole is inserted, is the area via which a compressive force is applied to a traverse hollow section.

Therefore, the planar design of this area has the advantage that the compressive force can be produced in a very homogeneous way and thus without stress peaks.

Alternatively, the surface of the nut body, which includes an opening of the blind hole, can have an outwardly bent or curved form. When a traverse hollow section of a vulcanizing press has a recess with a curved surface which is adapted to the outwardly curved form of the surface of the nut body, the two curved surfaces can be arranged like a joint head and a socket. As a result, it is possible to adjust an angular position of the tie bolt in relation to the traverse hollow section.

Furthermore, an area of the two surfaces of the axial ends of the nut can in each case be larger than a cross-sectional area of the blind hole. In particular with respect to the axial end of the nut which does not comprise the blind hole opening, this has the advantage that such an ergonomic outer contour of the nut is rendered possible.

In addition, a pin can be firmly connected to the nut body perpendicularly to the surface which can comprise the opening of the blind hole. The pin can protrude perpendicularly from the surface. The pin is preferably joined to the nut body by welding, soldering or adhering. The pin protrudes from the surface in order to be able to mesh with a counter-opening of a traverse hollow section. Due to this it is possible for a technician to position the nut and/or the clamping mechanism with little effort in the traverse hollow section. At the same time, the pin prevents the nut and/or the clamping mechanism from sliding off the predetermined position. Therefore, the pin acts as a positioning aid and as a slide-off protection device. The previously described pin is not necessary when the surface of the nut body which includes the blind hole has the above described curved surface.

The invention also comprises a clamping mechanism for a mobile vulcanizing press. The clamping mechanism can have at least one nut according to the invention and one tie bolt. Each of the two axial end portions of the tie bolt can be provided with one external thread, as a result of which each axial end of the tie bolt can be provided with a nut by means of a screw connection. Alternatively, the tie bolt can also only be provided with an external thread at one end portion thereof and only one nut can be mounted on the tie bolt.

Here, the axial end portions of the tie bolt preferably describe the two ends of the tie bolt formed along a longitudinal axis. It is particularly preferred for the external threads of the tie bolt not to be arranged totally up to a terminal edge of the tie bolt. As already pointed out above, the two nuts and the tie bolt can be screwed together by means of their internal and external threads, i.e. a screw connection can be formed. The fixing elements of the nuts can retain the tie bolt in a secure and permanent manner.

The length of the external thread of the tie bolt can be shorter than the length and/or depth of the blind hole of the nut. This preferred form has the advantage that the loop which forms the fixing element can embrace a portion of the tie bolt where the tie bolt has a smooth surface, in particular where there is no thread which might damage the fixing element when the loop is constricted around the tie bolt.

A longitudinal portion of the tie bolt, which can adjoin the respective external thread of the tie bolt, can have a diameter that can be smaller than a core diameter of the internal thread of the blind hole. In other words, this longitudinal portion is attached to the threaded portion on the axial inner side thereof. This longitudinal portion which preferably overlaps the above described portion having a smooth surface, can be embraced and constricted in an especially secure fashion by the loop of the fixing element, as a result of which the loss-protection device between nut and tie bolt is highly reliable.

At the two axial end portions, the tie bolt can have a terminal portion which can determine a length of the bolt and the diameter of which can be smaller than the diameter of the external thread. In other words, the terminal portion can border in an axial direction externally on the longitudinal portion that comprises the external thread. This terminal portion can have a rather small diameter, preferably the diameter is the smallest of the tie bolt and act as a stopper inside the blind hole. The terminal portion can preferably strike one end of the blind hole when the tie bolt was screwed as far as possible in the blind hole, thus providing a delimitation of a screw-in length of the tie bolt into the nut.

The two external threads of the tie bolt can work in opposite direction and the same applies to the threads of the nuts. The advantage of a thread design that works in opposite direction is to allow to grip the center of the tie bolt and to simultaneously screw said bolt in the two nuts by means of a rotary motion. This considerably reduces the effort when the clamping mechanism is clamped to traverse hollow sections.

A centrally arranged longitudinal portion of the tie bolt can have an external hex. The above mentioned clamping of the tie bolt is further facilitated via a hexagon or a comparable wrench flat since the technician can carry out the clamping operation by means of an open-end wrench.

The external hex can be integral with a tie bolt body. Furthermore, the tie bolt body can be a hollow body which preferably consists of high-strength steel. As a result, the tie bolt adopts a very low weight compared to tie bolts according to the prior art without losing its mechanical ability to withstand stress. An integral connection is achieved e.g. by suitable forming operations in the central longitudinal portion of the tie bolt where the external hex shall be provided.

The invention also comprises a mobile vulcanizing press. A mobile vulcanizing press can be disassembled in particular in individual components and be mounted again at any operating site. The vulcanizing press can comprise at least one clamping mechanism according to the invention and at least two traverse hollow sections in order to receive the clamping mechanism. The vulcanizing press according to the invention also has a relatively low weight due to the light-weight tie bolts and nuts. Furthermore, the vulcanizing press can be assembled with less (time) requirement due to the above described advantageous embodiments of the clamping mechanism, the safety at work being also improved.

In addition, the vulcanizing press can also have at least one hot plate and one air-filled or water-filled pressure pad and the required connection lines for the electric current and the pressure medium. A control unit can also be available and controls e.g. the pressurization and the temperature profiles for the vulcanization.

The two axial longitudinal ends of the traverse hollow section/s can have a recess, the width of which can be larger than or equal to a predefined longitudinal portion of the tie bolt. The traverse hollow section can also have a rectangular external cross-section. The traverse hollow section can additionally have an internal cross-section which can be barrel-shaped and have rounded corners. A cross-sectional area of the internal cross-section can have a size allowing to arrange therein at least one nut according to the invention.

The predefined longitudinal portion of the tie bolt is part of the tie bolt which in the state when the tie bolt is connected to the two nuts protrudes from the nut, preferably directly below the latter. The recess of the traverse hollow section is open towards the side, as a result of which the tie bolt can be laterally inserted into the recess. In other words, each nut of the clamping mechanism is associated with a traverse hollow section, such that the surface of the nut which includes the blind hole opening can exert a compressive force on an inner surface of the traverse hollow section. The internal cross-section of the traverse hollow section, i.e. the cross-section of the cavity of the traverse, can fully receive the nut. The corners are shaped in such a way that they can be identical with the outer contour of the nut. As a result, it is possible to obtain a highly homogenous stress distribution.

The barrel form of the internal cross-section also reduces the material employed, as a result of which the traverse hollow sections are also weight-optimized. In addition, the inner surface/s of the traverse hollow section have a bore at that site where the pin of the nut shall be received in order to provide assistance with positioning the nut and a slide-off protection device of the nut.

Furthermore, a rack which can serve as a positioning assistance for positioning the traverse hollow sections can be provided and can have a longitudinal body which can have a plurality of protrusions on an upper side thereof. Each of the two longitudinal ends of the longitudinal body of the rack can be provided with an arrow-shaped terminal plate.

The rack is designed in a particularly advantageous way in so far as the arrow-shaped terminal plate renders possible an arrangement of the traverses on the rack in both conveying directions. The background is that the traverse hollow sections are arranged in inclined fashion in relation to one another and that conventional racks only rendered possible the orientation of the traverse hollow sections in one direction. The optional protrusions can mesh with fitting recesses of the traverse hollow sections in order to retain the traverse hollow sections securely at their position.

The invention also comprises a support device for handling components of a mobile vulcanizing press according to the invention. The support device can have a hook-shaped main body and a handle rotatably mounted thereon.

Special advantages are the ease of handling and the flexibility when the support device is used, which are established inter alia on account of the rotatable handle. The handle is preferably rotatably mounted on the main body by means of a screw connection.

A perforated plate-shaped element can be arranged between a hook-shaped termination of the main body and the handle at right angles to the main body. In addition, the element can comprise a pin arranged perpendicularly to a surface of the element. The further components of the support device increase the possible uses of the carrying handle. Therefore, e.g. a traverse hollow section can very well be transported with the perforated element. The perforated element is additionally weight-optimized due to the hole.

In summary, it is possible according to the invention to provide a nut for a clamping mechanism which is in particular permanently connected to the tie bolt without additional securing means. The integrated loss-protection device between the nut and the tie bolt also adopts the technical function of sealing the blind hole, as a result of which the threaded connection between tie bolt and nut is not clogged with dirt. In addition, the mobile vulcanizing press and a support device are provided, which can be mounted and handled inter alia with less effort.

Figure 3:
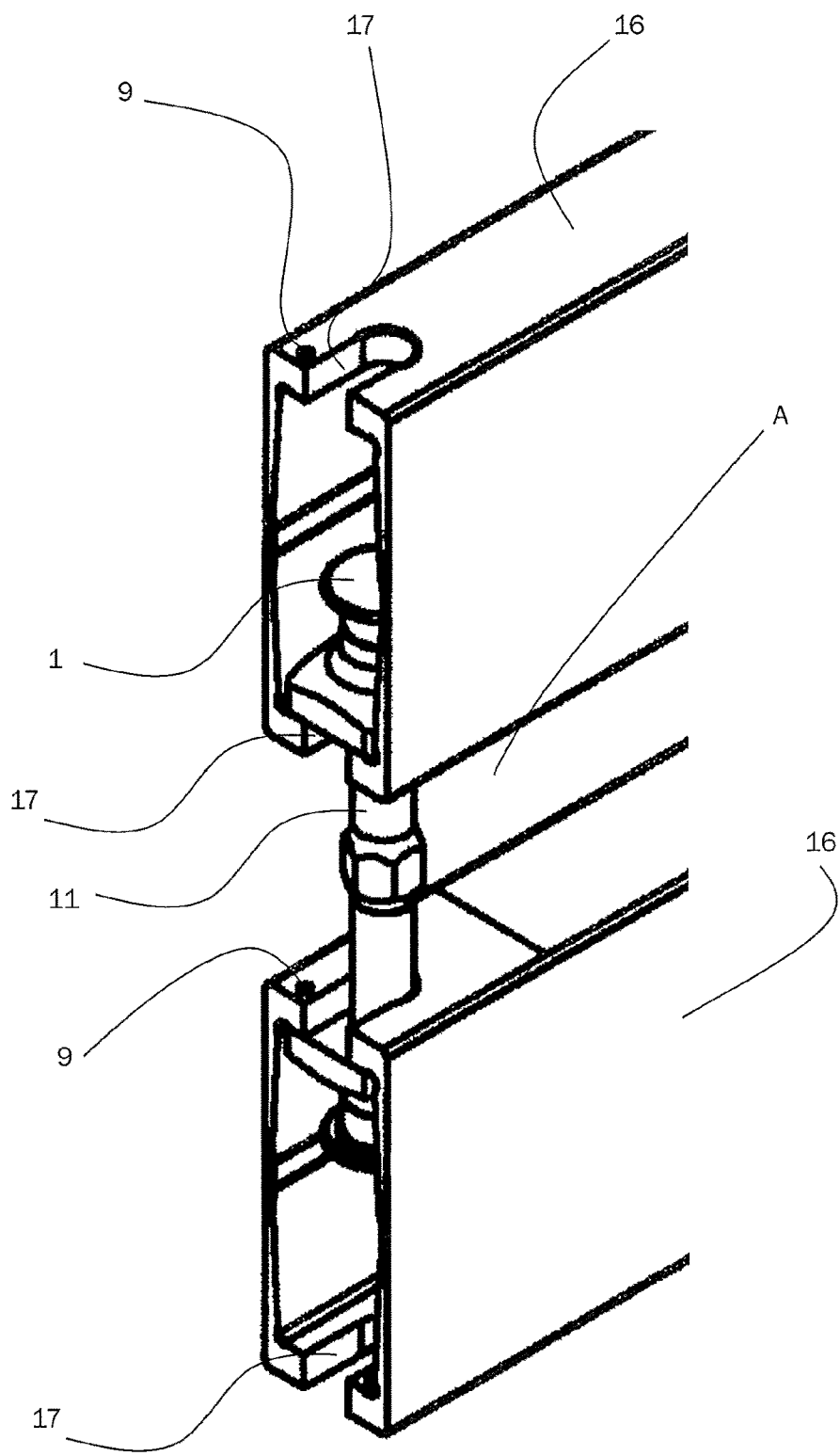
Figure 5A:
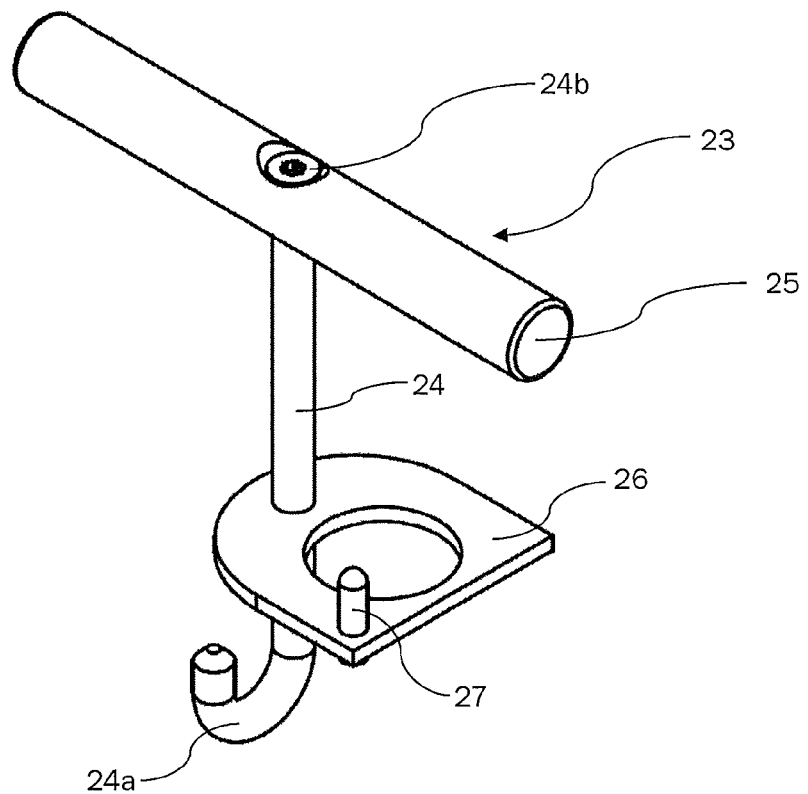
Figure 5B:
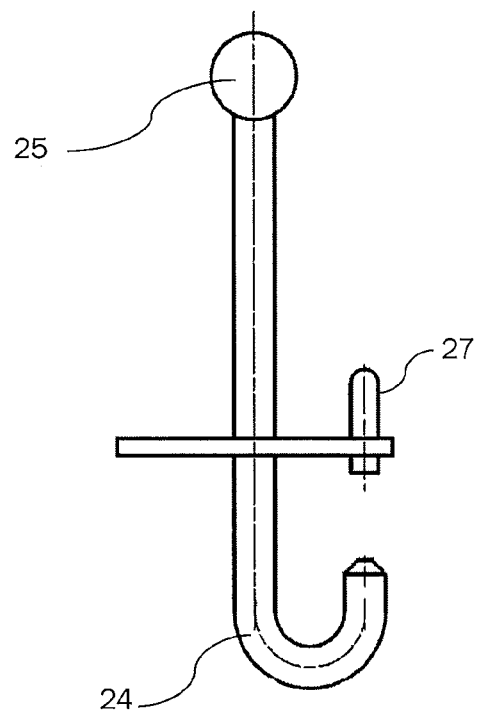

The invention is described by way of example below with reference to the enclosed schematic drawings, wherein FIG. 1a shows a clamping mechanism, FIG. 1b shows an enlarged section of a nut of the clamping mechanism, FIG. 2a shows a top view of a front side of a traverse hollow section, FIG. 2b shows a section through a clamping mechanism mounted on two traverse hollow sections and a sectional view A-A, FIG. 2c shows a top view of a front side of the two traverse hollow sections with a mounted clamping mechanism, FIG. 3 shows a perspective view of the two traverse hollow sections with a mounted clamping mechanism, FIG. 4a shows a perspective view of a rack, FIG. 4b shows a side view of the rack, FIG. 4c shows a top view of the rack, FIG. 4d shows a front view of the rack, FIG. 5a shows a perspective view of a support device, and FIG. 5b shows a side view of the support device.

Various examples of the present invention are specified below with reference to the drawings. Equal and/or similar elements in the drawings are here designated by equal reference signs. However, the present invention is not delimited to the described examples but comprises further modifications of features of the described examples and a combination of features of different examples within the scope of protection of the independent claims.

FIG. 1a shows a clamping mechanism 10 having two nuts 1 and a tie bolt 11. Each of the end portions of the tie bolt 11 is screwed in a blind hole 3 of the nuts 1. For this purpose, the blind hole 3 has an internal thread 3a and the tie bolt 11 has an external thread 12 at each of its end portions. The tie bolt preferably has a length between 200 and 400 mm, more preferably between 250 and 350 mm and most preferably between 280 and 320 mm. The weight of the tie bolt which is preferably made of high-strength steel is preferably between 1 and 6 kg, more preferably between 2 and 5 kg and most preferably between 3 and 4.5 kg.

A fixing element 7 permanently connects a longitudinal portion 13 of the tie bolt 11 to the nut 1. The longitudinal portion 13 preferably adjoins directly the external thread 12. In the longitudinal direction of the tie bolt 11, the external thread 12 preferably has a length between 10 and 30 mm, more preferably between 15 and 30 and most preferably between 20 and 30 mm. The external thread 12 is preferably between M35 and M55, more preferably between M40 and M50 and most preferably between M40 and M45. Furthermore, it is also possible to use different thread types, forms and/or designs. The fixing element 7 is arranged in the groove 4 and an access bore 5 visible in FIG. 2. The groove 4 is particularly well illustrated in the enlarged section shown in FIG. 1b. The groove 4 is arranged along an inner surface of the blind hole 3 and runs perpendicularly to a longitudinal axis of the blind hole 3, which is shown in a dashed line. The fixing element 7 shown in FIG. 1b has a rectangular cross-section and can in part protrude from the groove 4 and into the blind hole 3 or have the same cross-section as the groove 4. The access bore 5 and the groove 4 can preferably have the equal area size of the cross-section. The groove 4 and the access bore 5 can have a round cross-section including a diameter of preferably between 2 and 10 mm, more preferably between 2 and 6 mm and most preferably between 3 and 5 mm. It is noted that the fixing element 7 can also have different cross-sectional forms, such as a round or an oval form. The fixing element 7, which runs in the groove 4, forms a loop which is specified in connection with FIG. 2 and can embrace the longitudinal portion 13 of the tie bolt 11. This loop connects the nut 1 to the tie bolt in a secure and permanent fashion.

As also shown in FIG. 1 b, a length and/or depth L3 of the blind hole is longer than a length L12 of the external thread of the tie bolt 11. L3 is preferably between 60 and 100 mm, more preferably between 70 and 90 mm and most preferably between 80 and 90 mm. This renders possible a flexibility at the depth of screwing the tie bolt 11 in the nut 1 (the clamping) in so far as it can be ensured that the fixing element 7, if possible, rests on the smooth longitudinal portion 13 of the tie bolt 11. The advantage thus is that the fixing element 7 is prevented from resting on the external thread 12 of the tie bolt 11 in the mounted state of the tie bolt 11. The relatively sharp-edged external thread surface of the external thread 12 might damage the fixing element 7. The smooth longitudinal portion 13 where the fixing element 7 preferably rests when the tie bolt 11 and the nut 1 are assembled has a diameter tapering with respect to the external thread 12. The tapering diameter preferably has a size between 30 and 50 mm, more preferably between 35 and 45 and most preferably between 38 and 42 mm. Therefore, the fixing element 7 can well embrace this region and is not damaged by the rough thread surface.

FIG. 1*b* additionally shows a preferred outer design of the nut 1, which and/or the body of which was optimized with respect to the lowest possible weight and good ergonomics. For example, the nut 1 according to the invention is preferably made of high-strength steel and preferably has a weight between 1 and 4 kg and more preferably between 2 and 3 kg and most preferably between 2 and 2.5 kg. As shown in this figure, the two surfaces 2*a* and 2*b* are preferably arranged in parallel and made in planar fashion. The surface 2*a*, which is arranged on one of the (longitudinal) axial end portions of the nut 1, includes the opening 3*b* of the blind hole 3. The surface 2*a* preferably has a substantially square cross-section including a preferred edge length between 60 and 100 mm and a particularly preferred edge length between 80 and 95 mm. It is most preferred for the edge length to be between 85 and 90 mm. The lateral edges 2*c* of this surface 2*a* are preferably rounded, as shown in particular in FIGS. 2*b* and 2*c* in a better way. The surface 2*b*, which is opposite the surface 2*a*, is also planar and widened with respect to a side (a lateral surface) 2*e* of the nut 1. The surface 2*b* preferably has a round or circular and thus ergonomically shaped base.

The sideward (lateral) surface 2*e* has a marked taper between the two (longitudinal) axial end portions of the nut 1, as a result of which the nut 1 has the least possible weight and an unaffected mechanical resilience. In the direction of the surface 2*a*, the lateral surface 2*e* preferably has the illustrated wings, the height/length of which in the axial longitudinal direction of the nut 1 is preferably between 10 and 40 mm, more preferably between 10 and 30 mm and most preferably between 15 and 25 mm when proceeding from the surface 2*a*.

FIG. 2 also shows the clamping mechanism 10 and two traverse hollow sections 16. FIG. 2*a* first shows a front view of the traverse hollow section 16 and reveals that two recesses 17 are arranged opposite to each other at an outer edge of the traverse hollow section 16 (based on the longitudinal axis which is perpendicular to the plane of drawing). The recess 17 serves to receive the clamping mechanism 10, as shown in FIGS. 2*b*, 2*c* and 3. Furthermore, FIG. 2*a* shows the barrel-shaped design of an internal cross-section 16*a* of the traverse hollow section 16, which is accompanied by a weight reduction in the traverse hollow sections 16 since the wall thickness is reduced in a load-adapted way. The thinnest wall thickness of the traverse hollow sections 16 is preferably between 1 and 15 mm, more preferably between 3 and 10 mm and most preferably between 4 and 8 mm. The recess 17 preferably has a width between 20 and 80 mm, more preferably between 30 and 50 mm and most preferably between 35 and 45 mm. The recess 17 preferably has a depth up to 80 mm, more preferably up to 70 mm and most preferably up to 60 mm. A height of the traverse hollow section is preferably between 75 and 800 mm, more preferably between 100 and 500 mm and most preferably between 125 and 425 mm. The wall thickness of the portions which are provided with one recess 17 each is preferably between 10 and 45 mm, more preferable between 15 and 40 mm and most preferably between 20 and 30 mm. A portion where the recess 17 is arranged forms a force-absorbing side of the traverse hollow section 16.

FIG. 2*b* shows a section through part of the nut 1 and/or the body 2 thereof and through two traverse hollow sections 16. In FIG. 2*b*, the clamping mechanism 10 is already connected to the traverse hollow sections 16, one longitudinal portion of the tie bolt 11 each being arranged in a recess 17 of the traverse hollow section 16. The surface 2*a* of the nuts 1 rests in planar fashion on a respective inner side of the traverse hollow section.

The sectional view of FIG. 2*b* additionally shows bores 9 for receiving a pin 6, which protrudes perpendicularly from the surface 2*a* of the nut 1 and can be inserted into the bore 9 to establish a slide-off protection device of the nut 1 in the traverse hollow section 16.

FIG. 2*b* also shows that the form of the outer surfaces and/o lateral surface 2*e* of the nut 1 can be adapted in optimum fashion to the inner surface of the traverse hollow section 16 in the lower region of the nut body 2. In particular the rounded edges 2*c* of the nut 1 can be inserted in perfectly fitting manner into the radii of the corners of the internal cross-section 16*a* of the traverse hollow section 16. However, it is also possible to provide or have an air gap between the inner sides of the side walls of the traverse hollow section 16 and the nut 1. The radii of the corners of the internal cross-section 16*a* are preferably between R1 and R8 and more preferably between R4 and R7. As a result, no stress peaks occur when forces are transmitted from the nut 1 to the traverse hollow section 16. As shown, the nut 1 is fully arranged inside a cavity of the traverse hollow section 16. The traverse hollow sections 16 are preferably designed in such a way that a nut 1 can be arranged at an upper portion and a lower portion of the internal cross-section 16*a*. FIG. 2*c* additionally shows a front view of the mounted clamping mechanism 10 with the traverse hollow sections 16.

Furthermore, section A-A of FIG. 2*b* shows details of the nut 1 with respect to the access bore 5, the arrangement of the fixing element 7 inside the groove 4 and the access bore 5 and with respect to a fastening means 8, which can be connected to the fixing element 7.

The fastening means 8 has an external thread which is in contact with an internal thread 5*a* of the through-bore 5 and allows an adjustment of the relative position of the fastening means 8 inside the through-bore 5. In a first assembly of the clamping mechanism 10, it is particularly preferred for the fixing element 7 to be inserted into the access bore 5. Then, the fastening means 8, e.g. a screw, can be screwed in the access bore 5. When the fastening means 8 is screwed in, the fixing element 7 is pushed into its end position where the fixing element 7 forms a loop around the tie bolt 11, thus permanently securing the tie bolt 11 by the nut 1. Should the position of the fastening means 8 subsequently be prevented from being changed, the position of the fastening means 8 can be fixed finally in the access bore 5 by means of an adhesive.

Alternatively to the previously described example, the fastening means 8 can also be e.g. a sleeve which has an external thread and a support for fastening an end of the fixing element 7. The fixing element 7 can be firmly connected to the fastening means 8, e.g. by means of an adhesive connection or a clamping connection.

Section A-A shows the arrangement of the fastening means 8 and of the fixing element 7 in the through-bore 5 and/or the groove 4 after the fastening means 8 was screwed in its predetermined position. The fixing element 7 runs up to its opposite end around the groove 4 so as to form a loop. The loop embraces the diameter of the blind hole 3. The other end of the fixing element 7(i.e. the one that is not arranged on the fastening means 8) can be fixed inside the groove 4 by means of e.g. a frictional or a positive connection. For example, the groove 4 can have a taper, into which the end of the fixing element 7 can be clamped. Furthermore, the groove 4 can have an arbor which spikes and in this way retains the fixing element 7 at the end thereof. An adhesive bond can be realized e.g. by means of an adhesive connection.

According to the alternative example where the fastening means 8 and an end of the fixing element 7 are firmly connected to each other, the fastening means 8 can be rotated outwardly in the direction of an opening 5b of the access bore 5. Since the opposite end of the fixing element 7 can be fixed in the groove 4, the fixing element 7 can be expanded and the diameter of the loop of the fixing element 7 can be reduced. This constriction of the loop can be used in a tie bolt 11 screwed in the blind hole 3 to arrange the fixing element 7 in an even tighter way around the tie bolt 11, thus retaining the nut 1 in an even more secure way. When the fastening means 8 is screwed even deeper in the access bore 5, the protection of the tie bolt 11 can be loosened again by widening the loop.

Furthermore, the fixing element 7 according to the two above described alternatives can prevent the penetration of dirt and dust particles.

In addition, section A-A also shows the pin 6, which is firmly connected to the nut 1 and can be inserted into the above described hole/bore 9 of the traverse hollow section 16 in order to establish a slide-off protection device.

FIG. 3 finally shows the mounted clamping mechanism 10 having two traverse hollow sections 16 in perspective. The clamping mechanism 10 is inserted into the recesses 17 and the nuts 1 rest in planar fashion via an inner side of the traverse hollow sections 16. The nuts 1 are inserted in the traverse hollow sections 16 in such a way that the pin 6 meshes with the respective bore 9. The clamping mechanism 10 and the traverse hollow sections 16 are assembled according to the invention with very little effort: The pre-assembled clamping mechanism 10 can be inserted into the recesses 17. Thereafter, it is possible to attach an open-end wrench at the external hex 15 and, by rotating the tie bolt 11, to screw or clamp the latter into the desired position in the blind hole 3 of the nuts 1. Due to the preferred opposite direction of the threads 3a of the upper and lower nuts 1, the tie bolt 11 is clamped on both ends thereof by means of a rotary motion in one rotational direction, as a result of which a very time-efficient assembly is possible. In the above described alternative where the fastening means 8 and the fixing element 7 are firmly connected to each other, the nuts 1 in the traverse hollow sections 16 are preferably aligned in such a way that the opening 5a of the access bore 5 points in the direction of the open side of the traverse hollow sections 16. Having screwed in the tie bolt 11, it is thus possible to move the fastening means 8 in the access bore 5 in a further operating step in such a relative way that the fixing element 7 is constricted and embraces the longitudinal portion 13 of the tie bolt 11 even more closely. The longitudinal portion 13 preferably has a length between 10 and 50 mm and more preferably a length between 15 and 30 mm. When the fastening means 8 and the fixing element 7 according to the further described alternative are not firmly connected to each other and the fastening means 8 was fixed at a predetermined position during the pre-assembly, the latter operating step is omitted, as a result of which the assembly of the clamping mechanism 10 to the traverse hollow sections 16 can be carried out.

Furthermore, FIG. 3 shows an intermediate space A, which is arranged between the two traverse hollow sections 16. In the assembled state of a mobile vulcanizing press 20, in particular the hot plates, the pressure pad/s and the product to be vulcanized, e.g. a conveyor belt strip, are inserted or clamped in this intermediate space A between the traverse hollow sections. FIG. 3 shows a longitudinal end of a unit of the vulcanizing press 20 each having an upper traverse hollow section and a lower traverse hollow section 16 including the clamping mechanism 10 arranged on the two longitudinal ends. FIG. 3 here only shows one longitudinal end of the unit which is shown at a site along the longitudinal direction of the traverse hollow section 16 in cut-off fashion. The other longitudinal end of the unit is made in mirrored fashion with respect to the end shown in FIG. 3 and also has a clamping mechanism 10, which is inserted in the recess 17 of the upper traverse hollow section and lower traverse hollow section 16. In the assembled state, the mounted vulcanizing press 20 comprises a plurality of units arranged at a distance from one another in the transverse direction of the traverse hollow section 16, as described above. A longitudinal end thereof is shown in FIG. 3.

Furthermore, FIG. 4 shows part of a mobile vulcanizing press 20, which relates to a rack 18. The rack 18 facilitates the precise positioning and alignment of the traverse hollow sections 16. A vulcanizing press 20 has a plurality of traverse hollow sections 16 which are arranged in inclined and parallel fashion to one another in each case above and below the hot plates. The rack 18 here determines the alignment of the traverse hollow sections 16.

The illustrated rack 18 has a longitudinal body 19 with optional protrusions 21, which are preferably attached by welding or soldering. An arrow-like plate 22 is also attached to an end edge of the longitudinal body 19, said plate predetermining the inclined position of the traverse hollow sections 16 to be arranged on the rack 18. The arrow shape is advantageous because the rack 18 thus allows the arrangement of the traverse hollow sections 16 for the two conveying directions/inclined positions. The protrusions 21 can preferably be provided when the traverse hollow sections 16 e.g. have supports (not shown) into which the protrusions 21 can be inserted. The protrusions 21 then prevent the traverse hollow sections 16 from slipping out of place and predetermine the positioning thereof.

FIG. 4a shows a rack 18 in perspective. A side view which is cut off on one side is shown in FIG. 4b. An enlarged partial view in bird's eye perspective is shown in FIG. 4c which illustrates the arrow shape of the arrow-like element 22. FIG. 4d also shows a front view of the rack 18 with the arrow-like element 22.

FIG. 5 shows by means of the two views of FIGS. 5a and 5b a support device 23 for the mobile vulcanizing press 20 according to the invention and the partial components thereof. The support device 23 has a handle 25 which is rotatably mounted on a main body 24. For this purpose, a connecting screw 24b is provided, which holds or retains the handle 25 by the main body 24. The main body 24 is inserted in a through-bore of the handle 25 where the main body 24 can rotate. An end of the main body 24 has a hook form 24a allowing to hook e.g. into lugs in order to be able to carry components of the vulcanizing press 22 by means of lugs.

Furthermore, the support device 23 has the perforated plate-shaped element 26, shown in FIGS. 5a and 5b. A pin 27 protrudes perpendicularly from the surface thereof. The element 26 can preferably be used for lifting and supporting the hot plates and the traverse hollow sections 16. The pin 27 can be inserted in secure fashion into the bore 9 of the traverse hollow sections 16, as a result of which the traverse hollow sections 16 cannot slide off the support device 23. Depending on the dimensions of the component to be transported, the handle 25 can be aligned by means of a rotation in relation to the hook region 24a or the element 26 in such a way that an optimum grip and support is possible at any time.

In summary, a nut 1, a clamping mechanism 10, a mobile vulcanizing press 20 and a support device 23 are provided which can be handled with less effort and offer greater safety at work, are more robust and thus also have a longer service life, even under harsh conditions of use, and at the same time a lower weight.

The invention claimed is:

1. A nut for a clamping mechanism of a mobile vulcanizing press, the nut comprising:
   a nut body, which has a blind hole including an internal thread for receiving a tie bolt, and
   a groove and an access bore in the nut body for receiving a fixing element, wherein:
      the groove is arranged in a circumferential portion of the blind hole and the access bore connects an exterior side of the nut body to the groove,
      a fixing element is arranged in the groove and the access bore in such a way that the fixing element occupies at least a sub-portion of the access bore and/or the groove, and
      a fastening means is arranged in the access bore and the fixing element occupies at least a sub-portion of the access bore and it fully occupies the groove.

2. The nut of claim 1 wherein the fixing element is connected to the fastening means, wherein a relative position of the fastening means is adjustable in the access bore and the fastening means is connected to the fixing element in such a way that a change in the relative position of the fastening means causes an expansion or a compression of the fixing element.

3. The nut of claim 1 wherein the fixing element is strip-shaped and the material of the fixing element includes felt or a plastic material.

4. The nut of claim 1 wherein surfaces of the two axial ends of the nut body are planar and arranged in parallel to one another, wherein an opening of the blind hole is arranged in one of the two surfaces.

5. The nut of claim 1 wherein a surface of the nut body, which includes an opening of the blind hole, has an outwardly curved form.

6. The nut of claim 1 wherein an area of the two surfaces of axial ends is in each case larger than a cross-sectional area of the blind hole.

7. The nut of claim 1 wherein a pin is firmly connected to the nut body, said pin protruding perpendicularly from the surface where the opening of the blind hole is arranged.

8. A clamping mechanism for a mobile vulcanizing press, the clamping mechanism comprising:
   at least one nut comprising:
      a nut body, which has a blind hole including an internal thread for receiving a tie bolt, and
      a groove and an access bore in the nut body for receiving a fixing element, wherein the groove is arranged in a circumferential portion of the blind hole and the access bore connects an exterior side of the nut body to the groove, wherein a fixing element is arranged in the groove and the access bore in such a way that the fixing element occupies at least a sub-portion of the access bore and/or the groove, and wherein a fastening means is arranged in the access bore and the fixing element occupies at least a sub-portion of the access bore and it fully occupies the groove; and
   a tie bolt, wherein each of the two axial end portions of the tie bolt has an external thread, as a result of which a nut can be arranged at each axial end of the tie bolt by means of a screw connection.

9. The clamping mechanism of claim 8 wherein a length of the external thread of the tie bolt is shorter than a length of the blind hole of the nut.

10. The clamping mechanism of claim 8 wherein a longitudinal portion of the tie bolt, which adjoins the respective external thread of the tie bolt, has a diameter that is smaller than a core diameter of the internal thread of the blind hole.

11. The clamping mechanism of claim 8 wherein the two axial end portions of tie bolt have a terminal portion which determines a length of the tie bolt and the diameter of which is smaller than the diameter of the external thread.

12. The clamping mechanism of claim 8 wherein the two external threads of the tie bolt work in opposite direction.

13. The clamping mechanism of claim 8 wherein an external hex is arranged in a centrally arranged longitudinal portion of the tie bolt.

14. The clamping mechanism of claim 8 wherein an external hex is integral with a tie bolt body of the tie bolt, wherein the tie bolt body is a hollow body which is preferably made of high-strength steel.

15. A mobile vulcanizing press comprising:
   at least one clamping mechanism comprising:
      at least one nut comprising:
         a nut body, which has a blind hole including an internal thread for receiving a tie bolt, and
         a groove and an access bore in the nut body for receiving a fixing element, wherein the groove is arranged in a circumferential portion of the blind hole and the access bore connects an exterior side of the nut body to the groove, wherein a fixing element is arranged in the groove and the access bore in such a way that the fixing element occupies at least a sub-portion of the access bore and/or the groove, and wherein a fastening means is arranged in the access bore and the fixing element occupies at least a sub-portion of the access bore and it fully occupies the groove;
      a tie bolt, wherein each of the two axial end portions of the tie bolt has an external thread, as a result of which a nut can be arranged at each axial end of the tie bolt by means of a screw connection; and
   at least two traverse hollow sections for receiving the clamping mechanism.

16. The mobile vulcanizing press of claim 15 wherein the traverse hollow section has at least one recess at the two axial longitudinal ends thereof, the width of which is larger than or equal to a pre-defined longitudinal portion of the tie bolt and the traverse hollow section has a rectangular external cross-section and an internal cross-section, which has the form of a barrel and rounded corners, wherein a cross-sectional area of the internal cross-section has such a size that at least one nut can be arranged therein.

17. The mobile vulcanizing press of claim 15, further comprising a rack which has a longitudinal body having a plurality of protrusions on an upper side thereof, wherein an arrow-shaped terminal plate is arranged on each of the two longitudinal ends of the longitudinal body of the rack.

18. A support device for handling components of a mobile vulcanizing press, the support device comprising:
   a hook-shaped main body and a handle rotatably mounted thereon; and a perforated plate-shaped element arranged between a hook-shaped termination of the main body and the handle at right angles in relation to the main body, wherein the element comprises a pin arranged perpendicularly to a surface of the element.

19. The nut of claim 3 wherein the plastic material comprises an elastomer.

20. The nut of claim 3 wherein the fixing element has a plurality of spheres.

21. The nut of claim 20 wherein the plurality of spheres are made of a plastic material or a metal.

* * * * *